United States Patent [19]

Nasica et al.

[11] 3,744,538
[45] July 10, 1973

[54] APPARATUS FOR METERING AND DISTRIBUTING LIQUID AND PASTE-LIKE SUBSTANCES

[75] Inventors: Jean Roger Nasica, Roland Marc Torterotot, both of Paris, France

[73] Assignee: Intercan S.A. Chez la Fiduciaire, Wanner, Switzerland

[22] Filed: Nov. 13, 1970

[21] Appl. No.: 89,292

[30] Foreign Application Priority Data
Nov. 24, 1969 France .............................. 6940447

[52] U.S. Cl................. 141/242, 141/260, 141/284, 141/374, 222/309, 417/395
[51] Int. Cl............................................. B65b 37/20
[58] Field of Search.................. 141/181, 242, 243, 141/250, 251, 258, 260, 284, 374, 241; 185/15 A; 222/254, 255, 263, 267, 232, 283, 309; 417/395; 141/241

[56] References Cited
UNITED STATES PATENTS

| | | | |
|---|---|---|---|
| 989,546 | 4/1911 | Jensen ........................... | 141/181 X |
| 2,494,529 | 1/1950 | Wirtanen ........................ | 417/395 |
| 2,886,134 | 5/1959 | Simmons......................... | 184/15 A |
| 3,158,152 | 11/1964 | Bloom............................ | 417/395 X |
| 3,393,641 | 7/1968 | Miedaner et al................ | 417/395 X |
| 3,460,482 | 8/1969 | Jackson ......................... | 417/395 X |

FOREIGN PATENTS OR APPLICATIONS
1,413,152   8/1965   France ............................... 222/255

*Primary Examiner*—Houston S. Bell, Jr.
*Attorney*—Laurence R. Brown

[57] ABSTRACT

Apparatus for metering and dispensing liquid and paste-like substances, particularly dairy products or pharmaceutical products, and adapted to be incorporated in a packing machine, comprising a plurality of metering means each having a plunger partly surrounded by a skirt like diaphragm and each being connectable to a common source of a substance to be metered and dispensed and to a respective one of a plurality of distributing means; pneumatic control valves to control supply of the substance to the metering means and dispensing of the substance through outlet ports of the distributing mean; means for actuating the plungers of the metering means to carry out discharge strokes to transfer substance in the metering means to the distributing means, the plunger being indpendent of said means for actuating during a filling stroke and at the end of the filling stroke co-operating with an adjustable stop, each distributing means being movable, during dispensing of the substance, a distance at least equal to the height of the container to be filled and having drive means to ensure a retraction movement from the container which it is filling as the level of the substance dispensed into the container rises.

20 Claims, 8 Drawing Figures

Fig. 6

APPARATUS FOR METERING AND DISTRIBUTING LIQUID AND PASTE-LIKE SUBSTANCES

The invention concerns apparatus for metering and distributing liquid and paste-like substances and is particularly useful for dairy or pharmaceutical products.

Previously proposed apparatus of this kind has included metering means the volumes of which are only regulatable on a simultaneous basis, that is to say, the metering means were not individually regulatable since pistons thereof were attached to a common control bar both during filling and when the pistons were executing their compression strokes. Because of the unavoidable differences between the diameters of the various metering means, the same piston stroke results in the various metering means supplying different quantities of the product.

This drawback can of course be obviated by boring each of the metering means in a precise manner, but this involves considerable expense. Furthermore, when a piston of metering means draws a substance into a chamber thereof during an upward stroke, gaseous inclusions in the substance could gradually form a gas-pocket in the chamber so that the quantity discharged varied during the time that the apparatus was operating.

A delicate problem that was difficult to solve with previously proposed apparatus was that of uniformly distributing the substance in equal quantities in the various metering chambers when the substance was received from a common feed pipe. In fact, when the metering chambers were filled by the substance that was drawn in as a result of the simultaneous upward movement of all the pistons, the metering means situated nearer to the source of the substance tended to draw in more of the substance than metering means located farther away from the source, so that one and the same piston stroke caused different quantities of the substance to be passed to the metering means.

A further drawback of previously proposed apparatus resided in the fact that the distributing means caused the substance to drop into containers or other packing means from a height above the support for the containers and at least equal to the height of the containers. When the containers were being filled, the substance, as a result of its taking in of air, often formed a froth which overflowed from the containers and made it impossible for these to be sealed at a later stage. Furthermore, if the substance that was put into the containers was a thin fluid, splashing of the substance was inevitable and this rendered the upper edges of each container unsuitable for efficient subsequent sealing.

According to the invention there is provided apparatus for metering and distributing liquid and paste-like substances and adapted to be incorporated in a packing machine, comprising a plurality of metering means of regulatable volume, each equipped with a plunger and each connectable to common source of a substance to be metered and distributed and to a respective one of a plurality of distributing means corresponding in number to the number of metering means; a pneumatic control valve at the inlet side of each metering means between the common source and the metering means; at least one outlet port for each distributing means which can be closed by a pneumatic control valve; means for actuating the plungers of the metering means to effect a discharge stroke to force substance contained in the metering means towards the distributing means and alternatively to actuate the control valves of the metering means and the distributing means; a skirt-like diaphragm partly surrounding the plunger of each metering means, the plunger of each metering means being independent, during a filling stroke thereof, of said means for actuating, being adapted to cooperate with an adjustable stop at the end of a filling stroke and being connected to said means for actuating during a discharge stroke, each distributing means being mounted to move in a direction parallel to its outlet port and over a distance at least equal to the height of a respective container to be filled; and drive means to impart a retraction movement of each of the distributing means as filling of the containers proceeds.

The apparatus of the invention can overcome the above-mentioned drawbacks and permit precise regulation of the quantities of substance discharged by each of the individual metering means and the establishment and retention of a minimal and substantially constant distance between the surface of the substance passed to the containers and the lower end of the outlet port of each distributing means, when the containers are being filled.

In this way, the exact quantity of the product discharged by each metering means can be determined in a precise manner and be made equal to that of the other metering means, despite possible differences in the dimensions of the various metering means, since the discharge strokes of the pistons are rendered individually regulatable and, since the distributor is movable, the outlet port can be kept at a constant distance from the lever of the product passed to the container so that splashing or frothing can be completely avoided.

The invention is diagrammatically illustrated by way of example in the accompanying drawings, in which.

The metering and distributing apparatus illustrated in the drawings is particularly suitable for use in a machine for packing liquid or paste-like substances such a dairy products. Such a packing machine may comprise a station where the containers are formed, a station at which the containers are filled with a substance, and a station at which the filled containers are closed and sealed. The metering and distributing apparatus of the invention can be provided at the filling station of a packing machine of this kind, which machine is not described in detail in this specification since it does not form part of the invention.

To enable it to be mounted on the packing machine, the metering and distributing apparatus of FIGS. 1 to 4 comprises at each of its sides a curved bracket 1 and 2 which straddles a conveyor belt 3 that carries containers 81 and forms part of the machine. The upper part of each bracket 1 and 2 is solidly connected to a base plate 4 of a frame 5, whereas its lower ends carry rings 6 and 7, the axes of which lie parallel to the conveyor belt 3 and which are adapted to be clamped on to supporting tubes 8 forming part of the packing machine.

On its front side the metering and distributing apparatus has a plurality of metering means 9 arranged side-by-side in such manner that their axes define, for example, a plane parallel to the axis of one of the rings 6 and 7 and at right angles to the plane defined by the axes of all the rings 6 and 7. These metering means 9, fitted in a line on a front face of the frame 5, are each connected by their base and through a connection 11 to a common supply pipe 12 which is in permanent communication with a preferably pressurised source of a substance to be metered and distributed, the source not being illustrated in the drawings. To ensure correct filling of the metering means 9, particularly in the case where several such means are filled simultaneously it is always useful to employ a pressurised source of the substance, even if the metering means incorporates a device whereby the substance can be drawn thereinto.

Between the connection 11 and the base of a chamber 13 of the metering means 9, there is provided a valve 14, which may be a pneumatically operated diaphragm valve and which enables connection between the chamber 13 of the metering means 9 and the common supply pipe 12 to be established or interrupted. A piston-type plunger 15 is adapted to be axially displaced in the chamber 13 of the metering means 9, and the front and side faces of the plunger 15 are surrounded by a flexible but non-elastic diaphragm 16 which is in the form of a skirt and which is attached by its edge in a fluid-tight manner to the inner wall of the chamber 13 of the metering means 9. The lateral wall of the piston 15 is located a distance from the inner wall of the chamber 13, this distance corresponding to at least twice the thickness of the diaphragm 16. Within the chamber 13, the diaphragm 16 divides off in a fluid-tight manner two compartments 17 and 18, the lower compartment 17, hereinafter referred to as the metering compartment, communicating with the common supply pipe 12 through the valve 14 and the connection 11, and also with a corresponding distributing means 19 through a flexible pipe 53. The upper compartment 18 of the metering means 9 is defined by a short length of transparent tube 21 and communicates through an orifice 22 with a vacuum pump which is not illustrated.

A rod 23 of the plunger 15 passes in a fluid-tight manner through an upper supporting bar 24 above the upper compartment 18, the supporting bar 24 being solidly connected to the frame 5 and being bored at 25 so as to accommodate in a fluid-tight manner the upper end of the transparent tube 21. Another supporting bar 26 disposed below a lower body 27 of the metering means 9 is also solidly connected to the frame 5 by lateral uprights and keeps the edge of a diaphragm 14a of the valve 14 pressed against the lower body 27 of the metering means 9.

The upper supporting bar 24 contains as many bored holes 28 as there are metering means 9, each hole 28 comprising an upper screw-threaded portion 29 and a lower smooth portion 30 in which is fitted a tube 31 which acts as an adjustable stop and as a guide and which, when an upward stroke of the plunger 15 is completed, cooperates with a stop screw 32 provided on the plunger 15. The rod 23 of the plunger 15 passes in a fluid-tight manner through the stop tube 31 and, in the upper portion of its lateral face, it has a longitudinal keyway 33 parallel to the axis of the rod 23. Engaged in the keyway 33 is a key 50 connected to the frame 5 by way of supporting bar 24 thereby preventing any rotation of the rod 23, the free end of which, extending above the upper supporting bar 24, carries a roller 35.

During the downward stroke only, a horizontal drive bar 36 is applied to the roller 35, the ends of the bar 36 being connected to appropriate drive means. Advantageously, these drive means comprise a ram 37, (FIG. 4) one end 38 of which is hinged to the frame 5, while at its other end its piston rod 39 is connected to an endless chain 40 which runs over two sprocket wheels 41 and 42, mounted on respective shafts 43 and 44, the shafts being carried on bearings 45 associated with the frame 5. Each shaft 43 and 44 extends beyond the frame 5 on one side and at this position carries a disc 46 secured to the shaft and carrying a lug 47 disposed eccentrically of the shaft and connected to the end of the drive bar 36 by a ball-bearing unit 48 fitted in the bar. Thus, the reciprocatory movement of the piston of the ram 37 is first converted into a rotatory movement in both directions of the shafts 43 and 44 and thus of the corresponding disc 46, and finally into an up-and-down movement of the drive bar 36.

Figure 1:
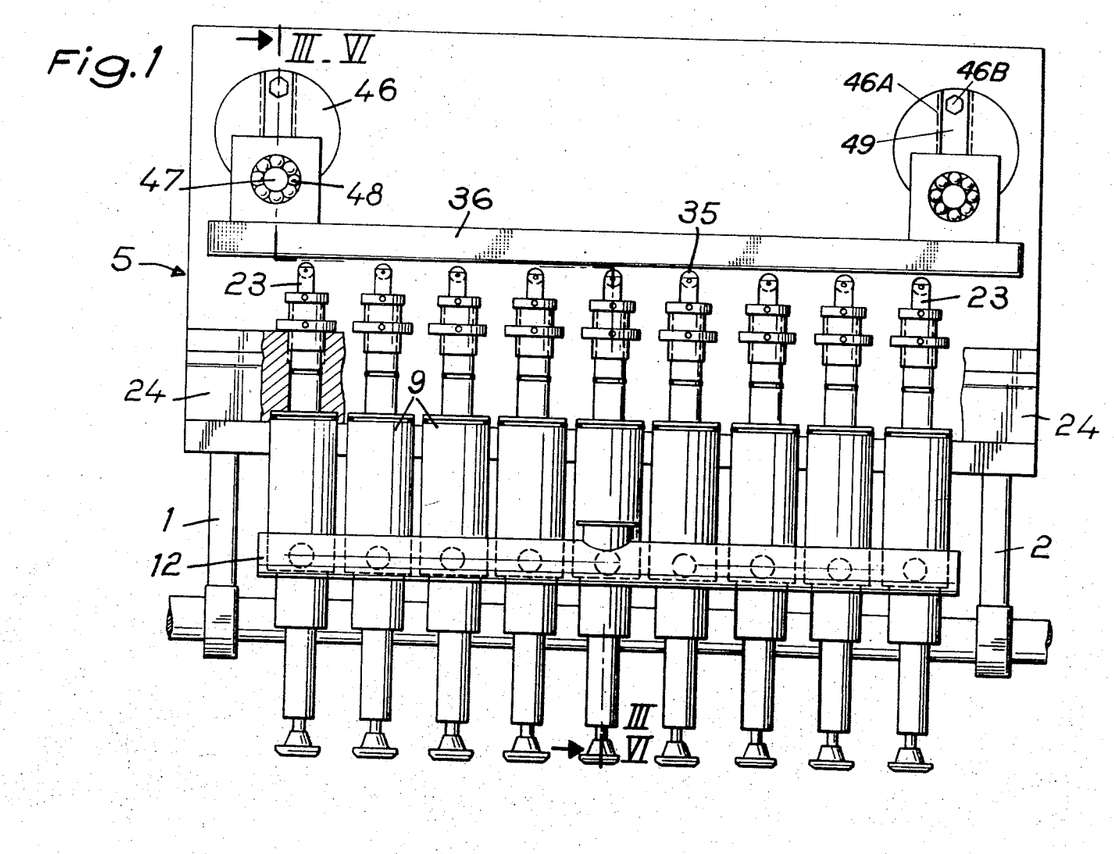
FIG. 1 is a front elevation of metering and distributing apparatus according to the invention.
Figure 3:
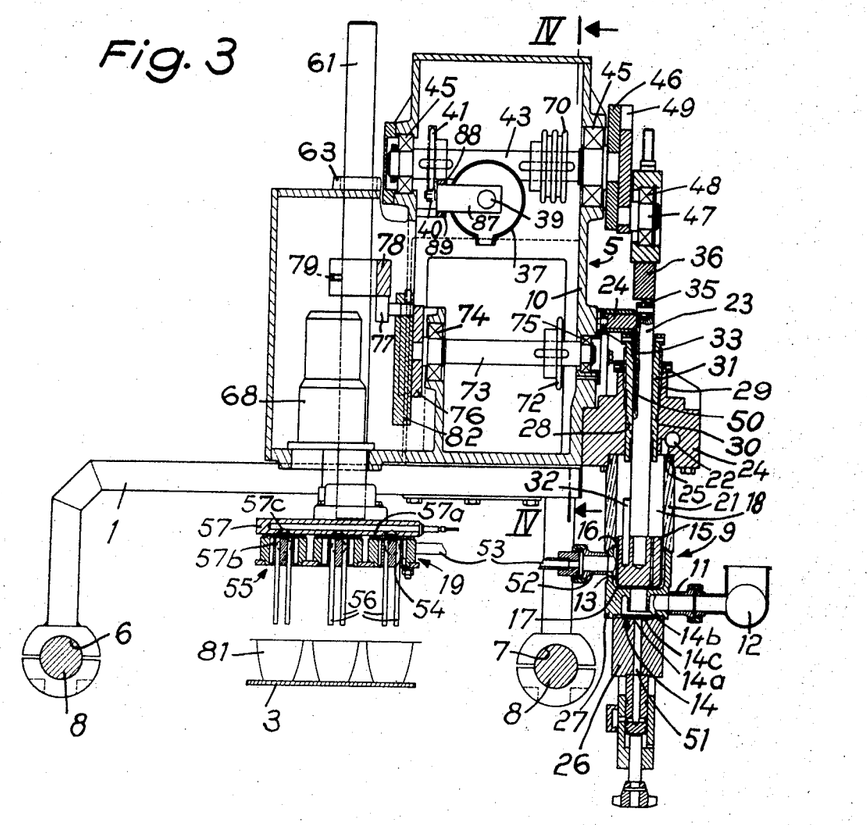
FIG. 3 is a vertical transverse section on line III—III of FIG. 1.

In a preferred arrangement, as seen in FIGS. 1 and 3, the lug 47 is solidly connected to a small plate 49 guided in a radial groove 46a in the disc 46 and adapted by set screw 46B to be radially positioned in groove 46A at a fixed position. In this way, the distance between the axis of rotation of the disc 46 and the lug 47 can be adjusted and so therefore can the vertical stroke of the drive bar 36.

The drive bar 36 could however if preferred be actuated by two vertical rams.

It is however important that the drive bar 36 should act on the rods 23 of the metering means 9 only during discharging strokes of the plungers 16 which expel the substance from the metering compartment 17, and that the length of discharge stroke of any one metering means should be adjustable independently of the lengths of strokes of the other metering means.

During a discharge stroke of the plunger 15, the valve 14 cuts off the metering compartment 17 from the connection 11 in that the diaphragm 14a is applied to a seat 14b with the help of a pressured fluid passed from a source, not illustrated, to a lower valve chamber 14c through an actuating valve and an orifice 51 bored in the lower support bar 26. When the substance is fed under pressure into the metering compartment 17, it is sufficient to connect the valve chamber 14c with atmosphere during the filling of the metering compartment 17. On the other hand, when filling is carried out by suction, it is advantageous to connect the valve chamber 14c to a vacuum source, such as a vacuum pump, during this operation, so as to keep the valve 14 open in opposition to the reduced pressure obtaining in the metering compartment 17 on the other side of the diaphragm 14a. Since, in accordance with a first arrangement, the intake movement is caused by a reduced pressure being set up in the upper compartment 18 through the orifice 22, it is of advantage to connect the valve chamber 14c to the upper compartment 18 during the intake stroke of the piston 15 by means of a pipe and a suitable valve, neither of which is illustrated.

A discharge union 52 terminates at the metering compartment 17, to which union there is attached the flexible pipe 53 which runs to a chamber 54 of a respective distributing means 19. As can be seen in the drawing, several distributing means 19 are grouped together in a distributing head 55. One or more outlet ports 56 terminate at the chamber 54 of each distributing means 19, the upper end of the or each port being adapted to be closed by a valve such as a pneumatic diaphragm valve 57. A diaphragm 57a, a seat 57b for which is constituted by the upper end of the or each outlet port 56, separates the chamber 54 of the distributing means 19 from a valve chamber 56, separates the chamber 54 of the distributing means 19 from a valve chamber 57c adapted to be connected through a valve to a pressurised fluid source not illustrated. The valve chambers 57c of all the distributing means 19 are connected to the pressurised fluid source through a common pipe 58.

Figure 2:
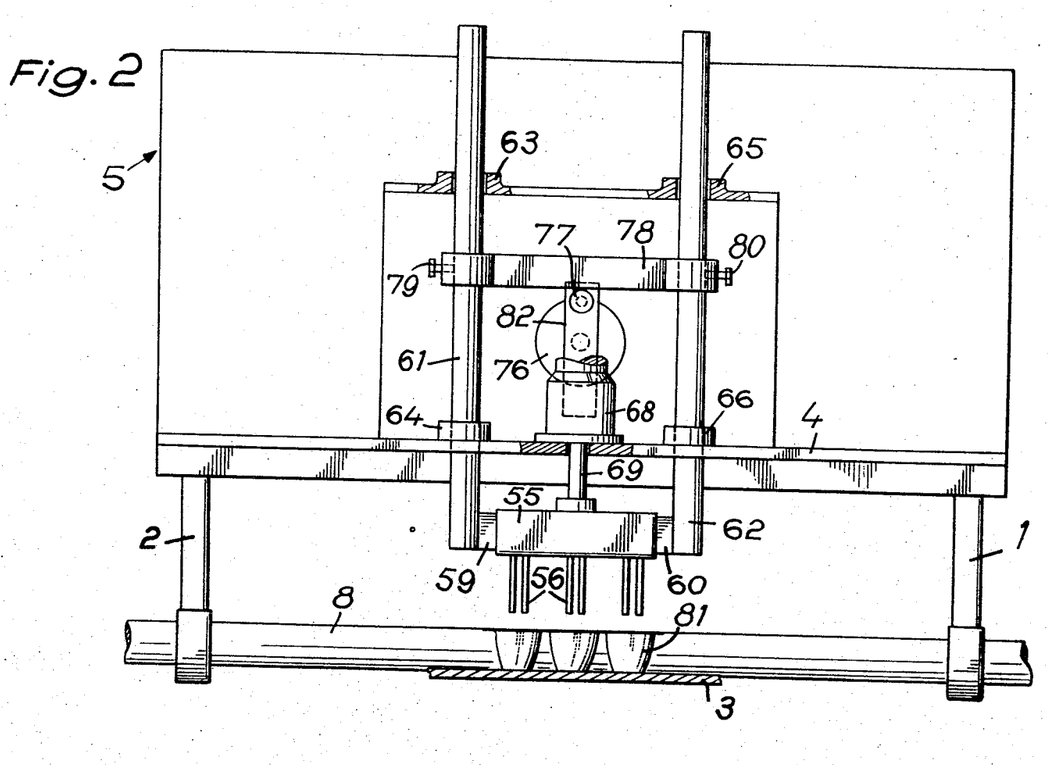
FIG. 2 shows a rear elevation of the apparatus shown in FIG. 1.

As can be seen, in particular in FIG. 2, the distributing head 55 and thus all the distributing means 19 are mounted to be displaceable in a direction parallel to the axis of the outlet ports 56 by means of two horizontal arms 59 and 60, each of which is solidly connected to one end of the distributing head 55 and rigidly attached, at the other side, to vertical guide tubes 61 and 62 each of which is slidable in guide bearings 63, 64 and 65 and 66 provided on the frame 5.

Figure 4:
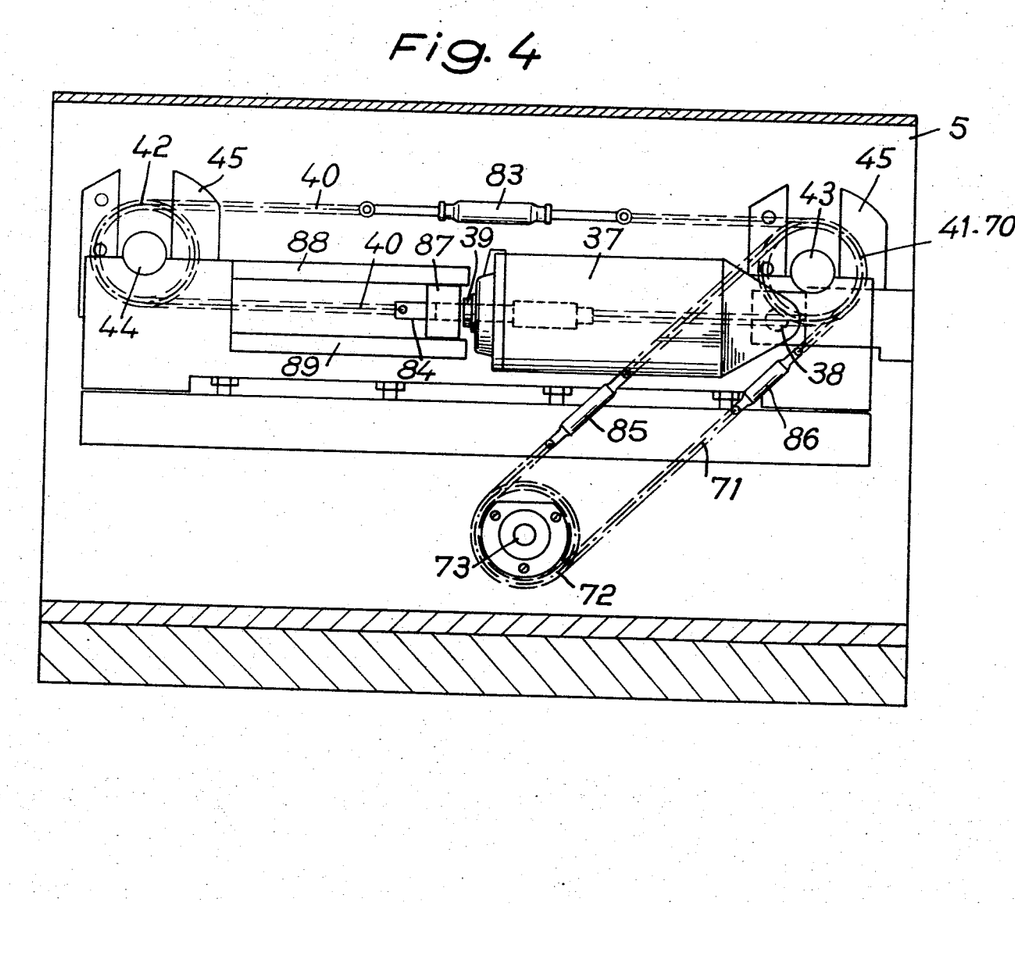
FIG. 4 is a vertical longitudinal section on line IV—IV of FIG. 3.

In a preferred form of construction, these means for actuating all the distributing means 19 contained in the distributing head 55 comprise an auxiliary ram 68 arranged vertically in the frame 5 and adapted to act in the downward direction through a rod 69 on the distributing head 55 and, by the drive jack 37 which acts on the shaft 43 through the endless chain 40 and the sprocket wheel 41 mounted on said shaft 43, through another sprocket wheel 70, FIG. 4, mounted on the same shaft 43, through an endless chain 71 passing round the sprocket wheels 70 and 72, the sprocket wheel 72 being mounted on a central shaft 73 fitted in bearings 74 and 75 associated with the frame 5, through a disc 76 mounted on the end of the central shaft 73 on the side of the distributing head 55, through a drive element such as a roller 77 which idles on said disc 76 and is fitted eccentrically of the axis of the central shaft 73, and through a horizontal connecting bar 78, secured on the guide tubes 61 and 62 by means of screws 79 and 80, and adapted to bear by its lower face against the roller 77 which is mounted on the disc 76 in such manner that it occupies its highest position when the lug 47 is in its lowest position (see FIG. 3). As a result of this particular arrangement, the beginning and end of the discharge strokes of the plungers 15 and the retraction of the relatively slow distributing means and the relatively rapid intermediate movements are achieved in a simple manner, and this is of considerable advantage for the discharge of the substance and the filling of containers 81.

Thus, when the drive bar 36 occupies its top position, the roller 77 is in its bottom position and the distributing head 55 can be moved rapidly downwards, without being fouled by the roller 77, by the auxiliary ram 68 so that the output ports 56 of each distributing means 19 move into the corresponding containers 81 that are to be filled, reaching a point near the bottom of the containers 18 which lie on the conveyor belt 3 below the distributing head 55. The substance which, during the upward stroke of the pistons 55, has moved into the various metering compartments 17 under the effect of the pressure applied to it, or by suction effect caused by the upward movement of the plungers 15 when the substance is not supplied under pressure, is discharged towards the distributing means 19 through the pipes 53 and from there is forced through the output ports 56 during the downward discharge stroke of the plungers 15, this movement being imparted by the drive bar 35 acting in a downward direction on the rollers 35 on the piston rods 23. It will be noted that the drive bar 36 does not necessarily bear simultaneously against the rollers 35, which, because of the different settings of the stops 31 and 32 from one plunger to another, can have been stopped at different levels at the end of the upward stroke of the plungers 15. During the upward stroke of the plungers 15 of course, the valves 14 are opened and the valves 57 of the distributing means 19 are closed, whereas during the downward discharge stroke of the plungers 15, the valves 14 are closed and the valves 57 are opened.

The distributing head 55 and thus the outlet ports 56 move relatively slowly upwards at the same rate as the plungers 15 descend, since the downward movement of the plungers 15 and the upward movement of the distributing means 19 are kinetically linked in an inverse manner because of transmission through sprocket wheels and endless chains, and through the drive and connecting bars described above. A further result is that the distance between the level of the substance discharged into the containers 81 and the lower end of the outlet port 56 remains almost constant during the filling of the containers 81. This distance can of course be varied when the shape of the containers 81 differs from that of the plungers 15, it is however always possible to employ plungers 15 of a form identical to that of the containers 81.

The distributing means 19 are thus raised at the same rate as that at which the plungers 15 move into the metering compartments 17 of the metering means 9.

In the arrangement illustrated in FIGS. 2 and 3, the roller 77 is radially adjustable in relation to the centre of the disc 76 by means of a slide 82 which carries the roller 77 and is guided and adapted to be immobilised in a dovetail groove cut in the disc 76 and extending through its centre located on the axis of the shaft 73.

Two tensioning means 83, 84 and 85, 86 are fitted in each of the endless chains 40 and 71, respectively connecting the various sprockets 41, 42 and 70, 72. The rod 39 of the ram 37 is connected to the lower run by means of a connecting piece 87 extending perpendicularly to the rod 39 and guided parallel to the axis of the rod 39 and to the chain 40 in guides 88 and 89 solidly connected to the frame 5.

The rams used in the apparatus are preferably powered by compressed air. In this case, it is useful to employ the exhaust compressed air from the rams as a means for producing a vacuum to obtain a permanent reduced pressure in the upper compartment 18 of the metering means 9. For this purpose there is provided an air-jet pump, the injector of which is connected to the exhaust pipe of the air rams, and in particular of the drive ram 37, and the chamber surrounding the injector of the pump is connected to the upper compartment 18 of the metering means 9 through a non-return valve opening towards the injector chamber.

Based on the main idea set forth above, it is obviously possible to construct modified forms which provide for the simultaneous downward movement of the plungers of the metering means and upward movement of the distributing head, which movements are preferably of identical length, complete freedom of choice being retained as regards the periods during which the plungers are raised and the distributing head is lowered into its lowest position.

Figure 4A:
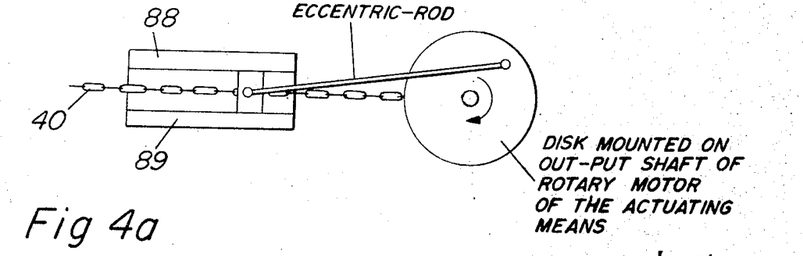
FIG. 4a is a sketch of an alternative ram arrangement to that of FIG. 4.

Thus, instead of the ram 37, of FIG. 4 the power means for the drive bar 36 and the connecting bar 78 could be a motor, for example an electric motor, fitted at the position where the ram 37 is located and adapted to act, through a guided sliding crank-rod arrangement, on the connecting piece 87' which is then solidly connected to the chain 40 and guided by the guides 88, 89. This method of constructing the drive means as shown in FIG. 4a may be useful in certain cases.

The auxiliary ram 68 described in connection with the first method of construction, it is not absolutely necessary. The two functions that it performs, namely, the imparting of a rapid downward movement to the distributing head 55 when fresh empty containers 81 are positioned below the head 55, and the maintenance of the head 55 in the raised position while the plungers 15 are executing their upward stroke, can be performed by other means. Thus, as can be seen from FIG. 5, at least one of the guide tubes 61, 62 can be associated with a locking element 90 which is adapted to retain the distributing head 55 in the raised position when it has reached that position, and to release it at a predetermined moment, which release is preferably achieved as a function of the position of the drive bar 36 or of an element kinetically linked thereto, A preferable arrangement is that wherein release of the distributing head 55 is initiated just before the drive bar 36 reaches the end of the upward stroke.

Figure 5:
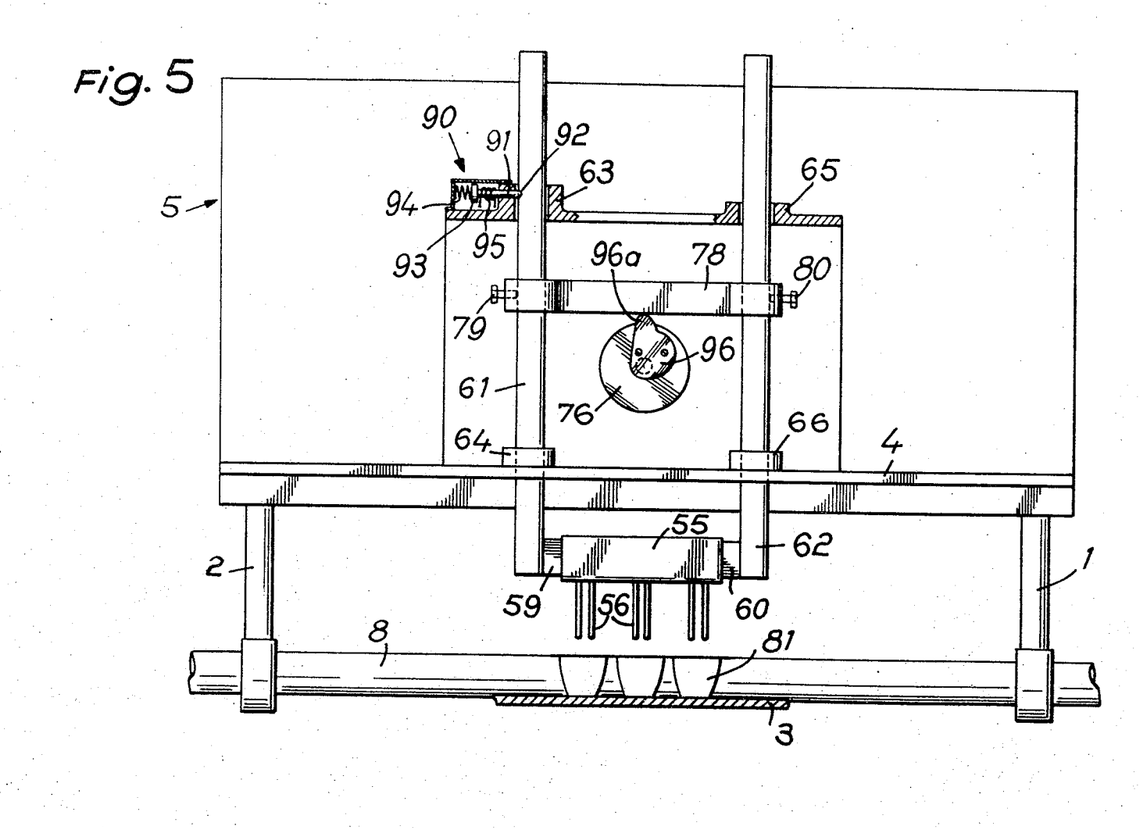
FIG. 5 is a rear elevation of a second embodiment of apparatus according to the invention.

The locking element 90 is mounted on the frame 5 close to the guide bearing 63 and may comprise a retaining catch 91, the front end of which is adapted to engage in a notch 92 in the tube 61 when the tube 61 is in the raised position, the rear end of the catch 91 carrying a disc 93 against which there bears a return spring 94 which biases the catch 91 towards the tube 61. The rear portion of the catch 91 constitues the core of an electromagnet, a coil 95 of which surrounds said rear portion and is connected to an energising circuit through a contact that can be temporarily closed by an element connected to the drive bar 36 or by this latter. When the coil 95 is energised, the catch 91 is retracted so that the tube 61 is freed and can drop together with the distributing head 55, a stroke-limiting stop, not illustrated, being provided to damp the fall and to arrest the distributing head in its lower position.

The containers 81 can be of any required shape. In the case of some shapes of container, it is certain that the upward speed of the sinusoidal movement imposed upon the distributing head 55 by the roller 77, mounted eccentrically on the disc 76 connected solidly to the central shaft 73, cannot ensure that a constant distance is maintained between the lower end of the outlet ports 56 and the rising level of the substance discharged into the containers 81. Therefore it is proposed to replace the roller 77 as the drive element by a cam 96 (FIG. 5) solidly connected to the central shaft 73 through, for example, the disc 76, which cam cooperates with the connecting bar 78 and has a contour suited to the shape of the container to be filled. As will be readily understood by the person skilled in the art, in the case of a container having a base of relatively small cross-section and an open end of relatively large cross-section for example, the active contour of the cam 96 must be such that the initial upward movement of the distributing head 55 takes place rapidly and the final part of this movement proceeds slowly while the product is being passed into the containers 81. In order to enable the ports 56 to be rapidly removed from the containers 81 after completion of the filling operation on these containers, it is advantageous to provide the cam 96 with a shoulder 96a which stands out sharply from the continuous line of the active contour of the cam.

Figure 6:
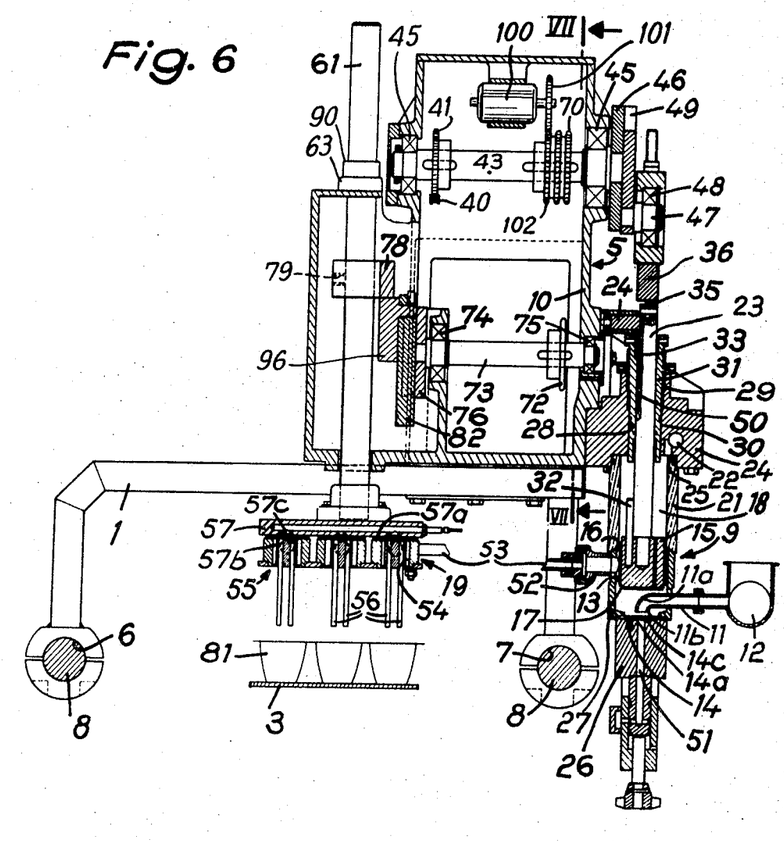
FIG. 6 is a vertical transverse section on line VI—VI of FIG. 1 but shows certain features of the second embodiment shown in FIG. 5.
Figure 7:
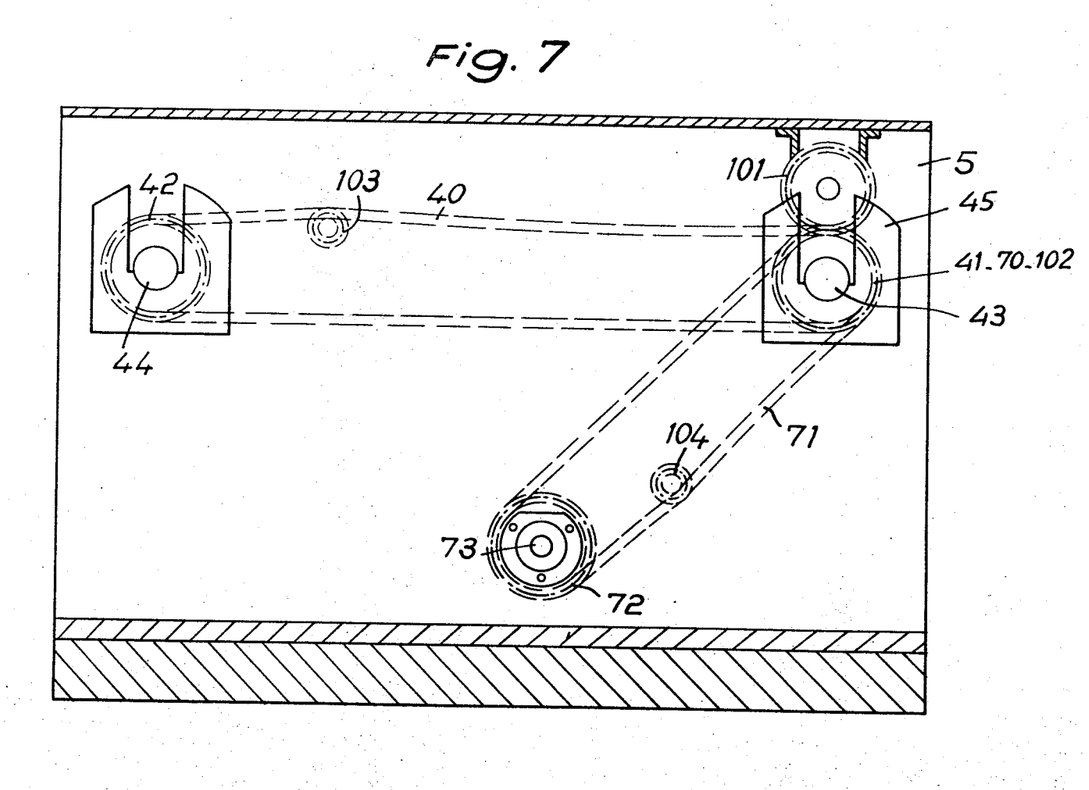
FIG. 7 is a vertical longitudinal section on line VII—VII of FIG. 6.

As can be seen from FIGS. 6 and 7, the ram 37 can be replaced by a rotary motor 100 suitably mounted in the frame 5, its rotary movement being transmitted in one direction to the shaft 43 through a toothed wheel 102 mounted on the shaft 43. This rotary movement is transmitted to the shafts 44 and 73 through the chains 40 and 71 which, in this case, do not include tensioning means 83, 85 and 86 as in the first arrangement. In place of these tensioning means 83, 85 and 86 there are provided, for each chain 40 and 71, at least one jockey wheel 103 and 104, the position of which can be adjusted.

In a further arrangement, the rotary movements of the shafts 43, 44 and 73 can be obtained from the movement of an element forming part of a machine located alongside the apparatus of the invention, or from another station of the packing machine with which the apparatus of the invention is associated. Thus, for example, it is possible to take the drive movement from a moving element associated with the station at which the containers are shaped and which is located at the side of the place where the apparatus of the invention is located, and to transmit the movement of this element to one of the shafts 43, 44 or 73 through a mechanical transmission system for example.

In accordance with a further modified form (see FIG. 6), the connection 11 connected to the common supply pipe 12 has a freen front end situated directly in the chamber 13 of the metering means 9, which chamber 13 extends downwardly without narrowing at all as far as the diaphragm 14a of the valve 14. This front end being constituted by an elbow 11a which is turned downwards so that a mouth 11b is located close to and above the diaphragm 14a. Thus, the valve 14, illustrated in FIG. 3, is here constituted by the mouth portion 11b, which acts as the valve-seat, and by the diaphragm 14a. In this way it is possible completely to prevent accumulation of solid or semi-solid products in the annular space surrounding the valve-seat, which products may be mixed for example with paste-like substances such as yoghurt and constituted by small pieces of fruit.

The metering and distributing means can of course be modified in many ways without thereby departing from the scope of the invention. Thus, for example, the downward movement of the plungers of the metering means and the simultaneous and proportional upward movement of the distributing head can be coordinated by means other than a mechanical transmission system.

This coordination can also be achieved by means of a programming device acting separately on the means for driving the plungers of the metering means and the distributing head.

What is claimed is:

1. Apparatus for metering and distributing liquid and paste-like substances into containers having a predetermined height and adapted to be incorporated in a packing machine, comprising a plurality of metering means of regulatable volume, each equipped with a plunger and each connectable to a common source of a substance to be metered and distributed and to a respective one of a plurality of distributing means corresponding in number to the number of metering means; a control valve at the inlet side of each metering means between the common source and the metering means; at least one outlet port for each distributing means and a control valve operable to close the port; means for actuating all the plungers of the metering means simultaneously to effect a discharge stroke to force substance contained in the metering means towards the distributing means; means to actuate the control valves of the metering means and the distributing means; the plunger of each metering means being independent, during a filling stroke thereof, of said means for actuating the plungers, each plunger having structure providing an adjustable stop at the end of a filling stroke and the plunger having structure connected to said means for actuating the plungers only during a discharge stroke, each distributing means having mountings to move it in a direction parallel to its outlet port and over a distance at least equal to the height of a respective container to be filled; and drive means to insert into said containers near the bottom and impart a retraction movement to each of the distributing means from the containers as the plungers are actuated and filling of the containers proceeds.

2. Apparatus as claimed in claim 1, wherein said means for actuating the plungers and said drive means are powered by a single actuating ram adapted to act simultaneously and in two opposite directions on the plungers and the distributing means respectively.

3. Apparatus as claimed in claim 1, wherein said drive means for displacing each of the distributing means in two opposite directions into and from the containers comprise two rams each of which acts on the distributing means only in a single direction opposite to that of the other.

4. Apparatus as claimed in claim 2, wherein the ram of the drive means comprises an air-operated ram.

5. Apparatus for metering and distributing liquid and paste-like substances into a container of predetermined height and adapted to be incorporated in a packing-machine, comprising:
- a plurality of metering means of regulatable volume having an inlet side and outlet side;
- a plurality of distributing means corresponding in number to the number of said metering means each being movable to a dispensing position in said container;
- a common source of a substance under pressure to be metered;
- a structure connecting each of said metering means to said common source and to one of the distributing means comprising a plunger partly surrounded by a skirt-like diaphragm and a pneumatic control valve interposed at the inlet side of said metering means;
- each of said distributing means having at least one outlet port and a pneumatic control valve to close said outlet port;
- an adjustable stop associated to each plunger and capable of stopping the filling stroke movement of said plunger;
- means for actuating the plungers of said metering means only to effect a discharge stroke so as to force substance contained in said metering means towards said distributing means; means independent from said actuating means for operating each of said plungers during each filling stroke;
- drive means to impart at least a retraction movement to said distributing means in a direction parallel to their outlet ports as the discharge stroke occurs, the course of said retraction movement being at least equal to said height of a respective container to be filled;
- said actuating means and said drive means comprising at least one motor adapted to act simultaneously and in two opposite directions on the plungers and the distributing means respectively.

6. Apparatus as claimed in claim 5, wherein said motor is constituted by a single actuating ram.

7. Apparatus as claimed in claim 5, wherein said motor is constituted by a rotary motor.

8. Apparatus as claimed in claim 5, wherein said actuating means for imparting a discharge stroke to the plungers of the metering means comprise a drive bar mounted to be displaced perpendicularly to its axis in a plane defined by the axes of said plungers, and adapted to act on said plunger only during the discharge stroke thereof.

9. Apparatus as claimed in claim 8, wherein the actuating means are mechanically connected to said drive bar through a transmission comprising at least one endless chain and a pair of sprocket wheels each mounted on one of two shafts surrounding excentrics comprising said drive element bearing upon the end portions of said drive bar to move it.

10. Apparatus as claimed in claim 9, wherein one of the two shafts of the transmission from the actuating means to the drive bar is constituted by a common shaft supporting at least two sprocket wheels one of which cooperates with the corresponding endless chain of the actuating means transmission.

11. Apparatus as claimed in claim 10, wherein the motor is rotary and means driving the common shaft therefrom by means of two intermeshing toothed wheels one of which is mounted on said common shaft and the other of which is solidly connected to the output shaft of said rotary motor.

12. Apparatus as claimed in claim 5, wherein said distributing means are equipped with a connecting bar solidly fixed thereon, and wherein said drive means comprise a drive element adapted to bear against said connecting bar.

13. Apparatus as claimed in claim 12, wherein said drive means are mechanically connected to the drive element through a transmission comprising at least one endless chain and a pair of sprocket wheels each of them being mounted on one of two shafts one of which is fixed to said drive element for said connecting bar.

14. Apparatus as claimed in claim 13, wherein the actuating means motor comprises a ram movable between two runs for one of the endless chains so that the axis of said ram is parallel to said runs.

15. Apparatus as claimed in claim 14, wherein the motor is rotary and means driving the ram by means of a rod eccentrically connected to the output shaft of said rotary motor and said ram is fixed to said endless chain.

16. Apparatus as claimed in claim 12, wherein the drive element is an eccentrically mounted roller.

17. Apparatus as claimed in claim 12, wherein the drive element is an eccentrically mounted cam.

18. Apparatus as claimed in claim 5, wherein said drive means comprise an air-operated auxiliary ram with a rod extending parallel to the movement of said distributing means and fixed thereon.

19. Apparatus as claimed in claim 5, including a metering compartment and a further compartment wherein the plunger and associated skirt-like diaphragm of each metering means separate the metering compartment from the further compartment, means traversing the further compartment in a fluid-tight manner including a rod fixed on said plunger, and a vacuum pump connected permanently to said further compartment.

20. Apparatus as claimed in claim 19, wherein said vacuum pump is an air-jet pump comprising an injector connected to the exhaust pipe of an air-operated ram and a chamber surrounding said injector connected to said further compartment of each of said metering means through a non-return valve opening towards said air-jet pump chamber.

* * * * *